United States Patent [19]

Liniger

[11] 4,030,916

[45] June 21, 1977

[54] PROCESS FOR RECOVERING LEAD FROM THE ACTIVE MATERIAL OF USED BATTERIES

[75] Inventor: Max Liniger, Basel, Switzerland

[73] Assignee: Andreas M. Liniger, Basel, Switzerland

[22] Filed: Jan. 6, 1976

[21] Appl. No.: 646,767

[30] Foreign Application Priority Data

Jan. 8, 1975 Switzerland .................. 153/75

[52] U.S. Cl. .................................................. 75/77
[51] Int. Cl.$^2$ ........................................ C22B 13/00
[58] Field of Search ................................. 75/77

[56] References Cited

UNITED STATES PATENTS

| | | | |
|---|---|---|---|
| 3,395,010 | 7/1968 | Shoeld | 75/77 |
| 3,689,253 | 9/1972 | Dorenfeld | 75/77 |
| 3,940,265 | 2/1976 | Wilson | 75/77 |

*Primary Examiner*—Peter D. Rosenberg
*Attorney, Agent, or Firm*—Merriam, Marshall, Shapiro & Klose

[57] ABSTRACT

Lead is recovered from the lead-containing sludge from used batteries by first heating the sludge at 100° – 150° C to drive off the water. The sludge is subsequently reacted at about 1,000° C with carbon powder in a closed electric furnace. The relatively small volume of water-free waste gas produced leads to a marked saving in energy. Not only dust but also the $SO_2$ can be removed simply from the waste gases.

7 Claims, No Drawings

PROCESS FOR RECOVERING LEAD FROM THE ACTIVE MATERIAL OF USED BATTERIES

The present invention concerns a process for recovering lead from the active material of used lead batteries, this material having been separated from the other battery parts in the form of a so-called lead sludge.

When known methods are used to remove the active material as lead sludge from lead-acid accumulators, then the sludge normally contains about 5 to 20% water, some sulphuric acid or an equivalent amount of sulphates and lead compounds. The relative amounts of these lead compounds depend on the extent to which the accumulator has been discharged. There is usually about 3 to 30% $PbO_2$, the balance being made up of $PbSO_4$. The lead content of these two compounds taken together is about 65 to 75% based on the dry weight of the sludge. The methods used today to recover the lead from said lead sludge involve "smelting" the sludge in a furnace by adding a small amount of coal and heating. The furnace may be oil or gas-fired, fixed or rotating. The lead compounds are thus decomposed, the coal acting as a reducing agent in combining with the oxygen liberated. $SO_2$ gas is also formed and is given off as such. The water contained in the sludge is evaporated. The combustion of the oil or gas produces $CO_2$ and other gaseous combustion products as is always the case with oil or gas firing. In addition, the reduction or "smelting" process produces waste gases which escape from the furnace at about 1000° C. It is worth noting however that the weight and volume of the gaseous combustion products are several times greater than the weight and volume of the waste gases resulting from the reducing process. These gases, which are given off at a high temperature, are a cause of considerable losses. The treatment of these gases necessary to avoid pollution of the environment, e.g. their cooling and filtering, requires extensive and expensive equipment. Removal of the $SO_2$ from such waste gases with fail-safe equipment and at a realistic cost has not yet proved feasible.

The aim of the present invention is to provide a process for recovering lead from the active material of used batteries in which the gases produced are virtually free of water, the volume of gas produced is several times smaller compared with known processes and the relative $SO_2$ content of the gases is several times greater. Thus not only dust but also the $SO_2$ can be removed simply from the gases after they have left the furnace.

The process of the invention is characterized in that all the water is removed by drying from the lead sludge obtained from the active material and the dried material ground down to the particle size of the original active material, the ground, dried material is then intimately mixed with anhydrous carbon powder and the resulting mixture heated in a closed furnace, the lead compounds constituting the active material thus being decomposed or reduced to metallic lead and the carbon powder being oxidised, further characterized in that the gaseous reaction products produced by this heating are cooled and filtered and the $SO_2$ component subsequently removed from the gaseous reaction products.

The process of the invention will now be explained briefly. The lead sludge is advantageously dried in completely closed vessels which are heated from outside to a temperature of 100° to 150° C. At least some of the heat necessary for this step can be taken from the hot waste gases given off when the lead sludge is heated with carbon powder as described later. It is of practical advantage if the vessels are fitted with mechanical agitating, grinding and discharging means. The steam generated during the drying stage is as a rule condensed and the condensed water used in removing the active material from the accumulator plates. Significantly less energy is required to evaporate the water from the lead sludge at a temperature of just over 100° C than at about 1000° C in a smelting furnace as in prior art processes.

Carbon powder is added to the active material which has been dried and simultaneously ground down to its original particle size (usually 20 to 50 microns). The carbon powder can for instance be coke dust. The carbon powder is generally added in an amount of from 2 to 9% by weight based on the weight of the ground, dried material. The two materials are then blended — as a rule in a separate mixer. The mixture is transferred either continuously or batchwise to a preferably electric furnace. In the furnace the mixture is heated strongly enough for the lead compounds to be split into Pb, $SO_2$ and oxygen, the latter oxidising the coke dust to CO and $CO_2$. The reaction velocity can be controlled by choosing a particular amount of coke dust of a particular particle size to mix in with the dried active material. The lead produced collects at the bottom of the furnace from where it can be drawn off continuously or at intervals. Only insignificant amounts of lead are lost.

Now in contrast to normal coal, carbon (e.g. coke) contains practically no organic constituents which give steam on burning. Furthermore, no water is liberated by the "smelting" process described. Thus the gaseous reaction products contain no steam.

The gas leaving the furnace is cooled and filtered. It contains $SO_2$, and CO and a little $CO_2$ and $O_2$, the relative proportions of which are somewhat dependent on the operational conditions and on the composition of the starting material.

It can easily be seen that, apart from loss of a certain amount of radiant heat, the "smelting" process of the invention only requires the heat necessary to decompose the lead compounds $PbO_2$ and $PbSO_4$ to be supplied from outside. Since no water at all is produced or liberated during the reaction, the amount of gas formed is practically that produced by the decomposition and reduction processes.

The minimisation of the amounts of waste gases formed and the fact that the gases are dry leads to two important advantages.

1. Fabric filters can be used to filter the waste gases (dust removal). Such filters enable any desired degree of purity to be achieved but involve only relatively low expenditure per unit volume of gas for equipment. This is particularly important as far as environmental pollution is concerned.

2. The $SO_2$, which makes up about 30 to 40% by weight of the waste gases, can be removed from the waste gases by known and reliable means so that the waste gases ultimately consist only of $CO_2$, CO and $O_2$.

Owing to the relatively high proportion of $SO_2$ in the waste gases it is profitable to remove it. This can be done by compressing the waste gases and cooling to a temperature at which the $SO_2$ liquefies under the pressure applied. The liquid $SO_2$ can then be drained off and stored in a pressure tank. Any aerosols which may be present are washed out at the same time, this increasing the purity of the residual gases which are discharged to the atmosphere.

EXAMPLE 40 tonnes of lead sludge removed from the plates of used lead-acid accumulators with water are fed over a period of 24 hours to a container (the dryer) of volume 25 m³ together with 500 tonnes of water. The dryer is a partly cylindrical, partly conical vessel equipped with with six agitators and scrapers and a shaft having helically arranged blades which is designed as a mixer and grinder and also acts as the discharger. The dryer can be heated by means of steam, pressurised water or oil circulating in a double jacket. The vessel is insulated with a 100 to 150 mm thick layer of insulating material such as mineral wool.

The dryer separates water from the sludge by allowing the sludge to settle and decanting water off. The residual water is evaporated off by heating the contents to over 100° C. The agitators, scrapers, and mixing and grinding means not only prevent sludge baking onto the hot surfaces but also reduce the material to its original particle size of less than 100 microns (1 micron = $10^{-6}$ m).

After 24 hours the supply of lead sludge is cut off and the sludge allowed to stand for another two hours, at the end of which about another 5 m³ of water are removed. The sludge now weighs 50 tonnes and contains 20% by weight of water, 16% by weight of $PbO_2$ and 64% by weight of $PbSO_4$. It is heated with agitation in the dryer for 72 hours at about 110° C. Afterwards the dried lead sludge weighs about 40 tonnes and contains less than 1% by weight of water. The particle size has been reduced to less than 1 mm and 90% by weight of the particles are smaller than 100 microns.

560 kg of the dried and ground lead sludge are mixed in a mixer with about 25 kg of the conventional additives necessary for the "smelting" process, e.g. roll or mill scale, quartz sand, lime sand and fluorite if necessary, together with about 15 to 30 kg of coke fines of particle size 0 to 6 mm (or 0 to 10 mm) or the same amount of electrographite of particle size greater than 0.01 mm. The mixture is then transferred to an electric furnace such as an induction furnace with a capacity of 800 kg of liquid lead where the mixture is continuously reduced to lead.

The reduction produces about 125 Nm³ of gaseous reaction products which include about 23% by volume (41% by weight) of $SO_2$, the balance being made up of CO. These gases are cooled in a closed tubular cooler having a cooling surface of about 4 m² to about 200° C with steam, pressurised water or oil. The heat recovered in this way can be used to heat the dryer. 200° C lies above the dew point of the gas mixture. It can therefore be cheaply and extremely effectively purified with a cloth filter (needle felt) having a filter area of 4 m² to give a residual dust content of 20 mg/Nm³.

The filtered gases are cooled to −27° C in further tubular coolers and at the same time compressed to 10 bars, thus causing about 80% of the $SO_2$ content to condense out. The liquid $SO_2$ can be drawn off from the condenser and transferred to pressure tanks where it is available for further use.

ENERGY CONSUMED IN THE DRYING PROCESS

The energy needed to dry 50 tonnes of lead sludge containing 20% by weight of water at 110° C in the way described above is calculated below.

| | |
|---|---|
| Evaporating the water | 7,400 kWh |
| Heating the $PbO_2$ to 110° C | 50 kWh |
| Heating the $PbSO_4$ to 110° C | 270 kWh |
| Heat lost from the dryer | 330 kWh |
| Mechanical drive | 430 kWh |
| | approx. 8,500 kWh |

By allowing the sludge to settle, the water content can be reduced at the most to about 14% by weight after 24 hours. If 50 tonnes of lead sludge containing this proportion of water are dried and simultaneously reduced to lead using coal in a furnace at 1,000° C, then 12,500 kWh are used simply to evaporate and heat the 7 tonnes of water contained in the sludge. The energy saving achieved by drying the lead sludge at 110° C in accordance with the invention thus amounts to about 4,000 kWh, i.e. about 47% of the energy supplied to the dryer. The energy saved with each 1,000 tonnes of lead produced is 150,000 kWh.

RELATIONSHIP BETWEEN ENERGY CONSUMPTION AND AMOUNT OF WASTE GAS

The energy consumed in the reaction of dried lead sludge with carbon using the necessary additives in a furnace is basically made up from the following (neglecting secondary losses):
1. heat required for the reduction
2. heat content of the lead drawn off
3. heat content of the hot waste gas.

Since (1) and (2) are the same with all types of furnace the volume of waste gas formed and its heat content are decisive as regards the profitability of the process.

The theoretical energy consumption of the reaction of a dried and ground lead sludge containing 20% by weight of $PbO_2$ and 80% by weight of $PbSO_4$ using carbon is about 0.3 kWh/kg of lead sludge when the only gaseous reaction products formed are CO and $SO_2$. Thus with 10,000 kcal (= 11.6 kWh) about 39 kg of such a powder can be reduced in an electric furnace, producing 6 kg (2.1 Nm³) of $SO_2$ and 7.2 kg (6.0 Nm³) of CO. Hence 39 kg of dried, ground lead sludge in an electric furnace produce 8.1 Nm³ of waste gas. The heat content of this volume of waste gas is about 3.3 kWh.

If on the other hand energy is provided by burning oil, then 1 kg of oil — which produces about 15 Nm³ of gaseous combustion products — is required to generate 11.6 kWh (= 10,000 kcal). Altogether about 23 Nm³ of waste gas are produced in this case when 39 kg of dried, ground lead sludge are reduced. The heat content of this volume of waste gas is about 9.8 kWh. The energy saving when an electric furnace is used, which results from the smaller volume of waste gas produced, is thus 9.8 − 3.3 kWh = 6.5 kWh or almost twice the heat content of the waste gas from the electric furnace. The energy consumption of an oil- or gas-fired furnace is in practice even higher because both a shaft furnace and a rotary furnace are usually operated with a large excess of air.

For every 1,000 tonnes of lead produced the energy saved by reducing ("smelting") in an electric furnace is 250,000 kWh.

RELATIONSHIP BETWEEN GAS FILTRATION AND VOLUME OF WASTE GAS

The formation of a small volume of waste gas with the electric furnace leads to the further advantage that the speed of the waste gas as it leaves the furnace may be lower than with the combustion furnace. Thus less dust is carried over with the waste gas. This small volume of waste gas can be cooled without injecting air or water into it (i.e. without increasing the volume) and purified with relatively cheap cloth filters. The filter area necessary is proportional to the gas volume, i.e. in the above Example the filter area can be made 3 times smaller than when using a combustion furnace. Furthermore, the use of a combustion furnace makes the use of costly electrostatic precipitators for dust removal necessary. Since no electrostatic precipitators are necessary with the present invention, the filtering costs decrease with decreasing gas volume at a rate even greater than that at which the gas volume decreases. Because the waste gases from the combustion furnace contain water, the electrostatic precipitators generally should also be resistant to corrosion, involving a further increase in filtering costs.

THE REMOVAL OF $SO_2$

The small volume of gas which emerges from the electric furnace has an $SO_2$ content of about 23% by volume (41% by weight), i.e. a higher $SO_2$ content than the waste gases from any other process. This high $SO_2$ content enables costly and unreliable scrubbing processes to be avoided and the $SO_2$ to be removed by known, proved methods, i.e. cooling to low temperatures and compressing. The table below shows what degree of separation can be attained by appropriate choice of pressure and temperature.

| Pressure | 1 bar$_{abs.}$ | 3 bars$_{abs.}$ | 5 bars$_{abs.}$ | 10 bars$_{abs.}$ |
|---|---|---|---|---|
| Degree of Separation | | Temperature in ° C | | |
| 20 % | −43.3 | −23.8 | −13.3 | +2,6 |
| 40 % | −47.8 | −29.3 | −19.3 | −4.3 |
| 60 % | −53.8 | −36.5 | −27.3 | −13.2 |
| 80 % | −63.3 | −47.8 | −39.6 | −27.3 |
| 90 % | −71.9 | −57.9 | −50.6 | −39.6 |
| 95 % | −79.6 | −67.0 | −60.4 | −50.6 |
| 98 % | −88.9 | −77.7 | −71.9 | −63.3 |

Even if the use of the waste gases for drying purposes, the cheaper cooling and purification equipment and the possibility of recovering $SO_2$ are not taken into account, the possible financial saving per 1,000 tonnes of lead as a result of the lower energy consumption is still Sw. Fr. 15,000. — on the drying costs (assuming an energy price of Sw. Fr. 0.10/kWh) and Sw. Fr. 25,000. — as a result of the smaller gas volume. The total saving is thus Sw. Fr. 40,000. — per 1,000 tonnes of lead or Sw. Fr. 0.04 per kg of Pb.

I claim:

1. A process for recovering lead from the active material of used lead batteries, said material having been separated from the other battery parts in the form of lead sludge, said process comprising drying the lead sludge to remove substantially all water; grinding the dried sludge to a particle size approximating that of the original active material; intimately mixing the ground dried sludge with anhydrous carbon powder; heating the resulting mixture in a closed furnace to decompose and reduce the lead compounds in the sludge to metallic lead, the carbon powder being oxidized; filtering and compressing the gaseous reaction products produced by the heating step; cooling said compressed gaseous reaction products to liqueify the $SO_2$ content thereof; and removing said liquefied $SO_2$ from the remaining gaseous reaction products.

2. The process of claim 1 in which the lead sludge is dried at a temperature between 100° and 150° C.

3. The process of claim 2 in which the mixture of ground, dried sludge and anhydrous carbon is heated in an electric furnace.

4. The process of claim 3 in which the heat necessary to dry the lead sludge is at least partly supplied by the heat content of the gaseous reaction products.

5. The process of claim 1 in which coke is used as the carbon powder.

6. The process of claim 1 in which the dried sludge is ground to a particle size of 20 to 50 microns.

7. The process of claim 1 in which 2 to 9% by weight of carbon powder, based on the weight of the dried sludge, is added to the ground, dried sludge.

* * * * *